UNITED STATES PATENT OFFICE.

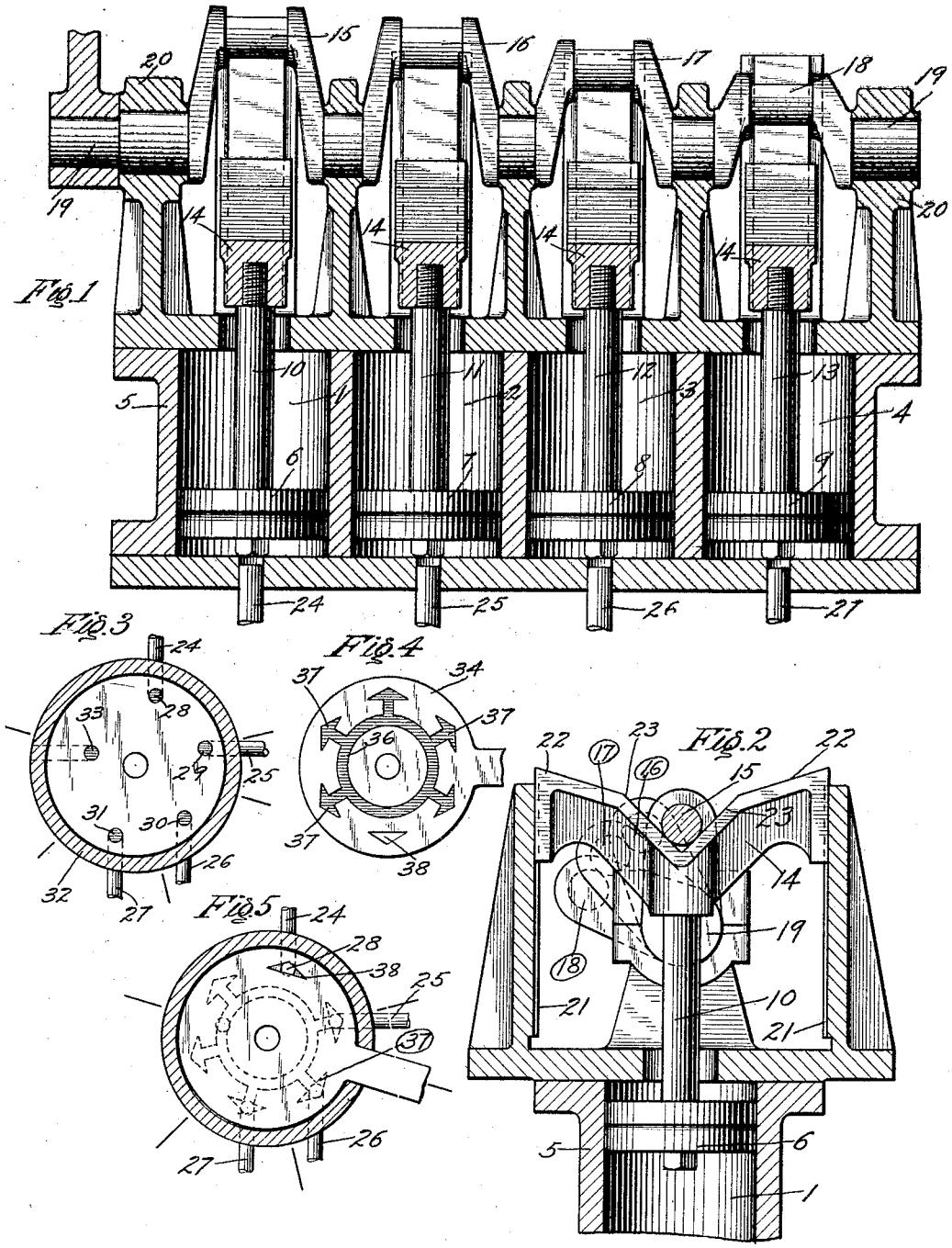

LELAND F. GOODSPEED, OF MILWAUKEE, WISCONSIN, ASSIGNOR OF ONE-HALF TO HENRY HERMAN WESTINGHOUSE, OF NEW YORK, N. Y.

FLUID-PRESSURE CONTROL DEVICE.

1,115,662.

Specification of Letters Patent.

Patented Nov. 3, 1914.

Application filed February 1, 1912. Serial No. 674,633.

*To all whom it may concern:*

Be it known that I, LELAND F. GOODSPEED, a citizen of the United States, residing at Milwaukee, in the county of Milwaukee and State of Wisconsin, have invented new and useful Improvements in Fluid - Pressure Control Devices, of which the following is a specification.

This invention relates to a fluid pressure control device, more particularly for controlling the operation of speed gear mechanisms as employed in connection with self-propelled vehicles, although adapted for controlling other forms of apparatus.

In my prior Patent No. 1,004,016, dated September 26, 1911, is shown and described a control device comprising a plurality of cylinders containing fluid operated pistons for actuating a control shaft, having a plurality of cranks set at different angles. Each piston carries a crosshead having inclined faces adapted to coöperate with a corresponding crank and the crank shaft may thus be turned to predetermined positions by admitting fluid to some one of the different cylinders. According to this prior patent, means are provided for preventing the operation of one piston unless another piston has previously been shifted to a predetermined position, so that the pistons are effective to turn the control shaft only in accordance with a predetermined order or sequence.

In some classes of service, it is desirable to be able to operate the control device so that any desired position can be directly attained without first necessitating the shifting of the control device through intermediate positions, and the principal object of my present invention is to accomplish the above purpose.

In the accompanying drawing, Figure 1 is a central sectional view of a control device embodying my invention; Fig. 2 a sectional view of one control cylinder and piston, showing the parts in the position assumed upon operation of the piston by fluid under pressure; Fig. 3 a plan view of the rotary valve seat of the controlling valve for supplying and releasing fluid to and from the control cylinders; Fig. 4 a face view of the rotary valve; and Fig. 5 a diagrammatic view of the controlling valve, showing the rotary valve in position for supplying fluid to one of the control cylinders.

As shown in Fig. 1 of the drawing, a plurality of cylinders 1, 2, 3, and 4 may be provided in a suitable casing 5 and contained in the respective cylinders are pistons 6, 7, 8, and 9. Each of the piston stems 10, 11, 12, and 13 carries a crosshead 14, as shown in detail in Fig. 2, and each cross head has inclined faces adapted to bear against cranks 15, 16, 17, and 18 of a crank shaft 19. The crank shaft 19 is mounted in bearings 20 carried by the casing 5 and the rotation of said shaft is adapted to shift a control mechanism, such as the change speed gears of a self-propelled vehicle, to the different operating positions. The cranks 15, 16, 17, and 18 are set at different angles, according to the rotative movements desired, such as the angular positions shown in dotted lines in Fig. 2, for example. Each crosshead 14 is adapted to reciprocate between guide bearings 21 and is provided with inclined faces on opposite sides of the axial line, preferably two faces 22 and 23 adapted to bear against a coöperating crank of the crank shaft 19.

The faces 22 and 23 are disposed at different angles so as to engage the cranks tangentially to the direction of movement, at least approximately, so that an excessive movement of the piston will be avoided, such as would be necessary where a single pair of inclined faces is employed.

Communicating with cylinders 1, 2, 3, and 4 at the respective outer faces of the pistons 6, 7, 8, and 9, are pipes 24, 25, 26, and 27 and said pipes lead to ports 28, 29, 30, and 31 in the seat of a fluid controlling valve 32. Said seat is also provided with an atmospheric exhaust port 33. A rotary valve 34 is provided having a cavity in its face, of which a ring shaped portion 36 continually registers with exhaust port 33. Extending from the ring portion 36 are a series of double wedge shaped portions 37, spaced apart so as to respectively register with the ports 28 to 31 inclusive. The rotary valve 34 is also provided with a double wedge shaped through port 38 which is adapted to register with the ports 28 to 31 inclusive upon rotation of the rotary valve, and the chamber above the rotary valve is constantly charged with fluid under pressure by connecting same with a suitable source of pressure.

In operation, the rotary valve may be turned to a position, such as that illustrated in Fig. 5, in which the through port 38 in the rotary valve registers with port 28 leading to pipe 24 and the cylinder 1. Fluid under pressure is thereupon admitted to the cylinder 1 and acts on pistons 6, shifting the same to the position shown in Fig. 2. The crank shaft 19 is thus turned so that the crank 15 is at its extreme outward position. When port 38 registers with port 28, ports 29, 30, and 31 each register with one of the cavity projections 37 so that all the cylinders except cylinder 1 are connected to the atmosphere by way of the exhaust port 33, and consequently the pistons 7, 8, and 9 remain at their lower positions.

It will be seen that the spacing of the rotary valve ports is such that when the through port 38 registers with any one of the ports 28 to 31 inclusive, the remaining ports are connected to the atmosphere.

If a crank is in its extreme lateral position, as for instance, the position of the crank 18 in Fig. 2, then the incline 22 of the corresponding crosshead will first engage same, the incline being approximately tangent to the direction of movement. At an intermediate point the crank engages the inclined surface 23, which is at an angle substantially corresponding with the tangent to the direction of motion at that point. Inclines are provided on either side of the axial line of the crossheads, so that each crosshead is adapted to operate its corresponding crank from any position. This ability to shift the crank shaft to any position corresponding with a given crank regardless of the position of the other cranks, is often desirable, especially in connection with change speed gears for self-propelled vehicles, for example, with my control mechanism, the crank shaft may be shifted from off position directly to low, intermediate, or high gear, and in the reverse direction from high gear directly to intermediate, low, or off position, in fact, by turning the rotary valve to any one of its operating positions, fluid may be admitted to the corresponding cylinder and thereby the piston operates its crosshead and turns the crank shaft to the position corresponding with that particular crank, regardless of the previous position of the crank shaft.

Having now described my invention, what I claim as new and desire to secure by Letters Patent, is:—

1. A control device comprising a crank shaft provided with a plurality of cranks, a fluid operated piston in alinement with each crank, a cross head carried by each piston provided with oppositely inclined faces converging at the longitudinal axis of the piston for engaging the crank and additional oppositely inclined faces arranged at a more obtuse angle than the first mentioned faces for also engaging the crank.

2. In a control device, the combination with a crank, of a fluid actuated piston and a crosshead carried by said piston for operating said crank, the crosshead being provided with a pair of oppositely inclined faces for engaging the crank and another pair of oppositely inclined faces at an angle to the first mentioned faces for also engaging said crank.

In testimony whereof I have hereunto set my hand.

LELAND F. GOODSPEED.

Witnesses:
R. H. WEILAND,
W. K. BOYLE.

Copies of this patent may be obtained for five cents each, by addressing the "Commissioner of Patents, Washington, D. C."